United States Patent [19]

Dan et al.

[11] Patent Number: 4,787,609
[45] Date of Patent: Nov. 29, 1988

[54] VIBRATION ISOLATING APPARATUS

[75] Inventors: Takuya Dan; Tatsuro Ishiyama, both of Yokohama, Japan

[73] Assignee: Bridgestone Corporation, Tokyo, Japan

[21] Appl. No.: 127

[22] Filed: Jan. 2, 1987

[51] Int. Cl.⁴ .................. B60G 15/04; F16M 5/00; F16F 13/00
[52] U.S. Cl. .................. 267/140; 248/562; 248/636; 267/35; 267/140.5; 267/219
[58] Field of Search .............. 267/140.1, 140.2, 140.3, 267/140.4, 140.5, 141, 141.1, 141.2, 141.3, 35, 219; 248/562, 565, 636, 637, 638; 180/312

[56] References Cited

U.S. PATENT DOCUMENTS

| 1,114,284 | 10/1914 | Olsen | 267/35 X |
| 1,800,434 | 4/1931 | Christman | 267/141.2 |
| 4,424,960 | 1/1984 | Dan et al. | 267/8 R |
| 4,505,462 | 3/1985 | Dan et al. | 267/140.2 |
| 4,535,976 | 8/1985 | Dan et al. | 267/8 R |
| 4,595,183 | 6/1986 | Dan et al. | 267/140.1 |
| 4,630,806 | 12/1986 | Dan et al. | 267/140.1 |
| 4,630,808 | 12/1986 | Ushijima et al. | 267/140.1 |
| 4,687,188 | 8/1987 | Knurek et al. | 248/562 X |

FOREIGN PATENT DOCUMENTS 0113835  6/1985  Japan .................. 267/140.1

Primary Examiner—Douglas C. Butler
Assistant Examiner—Matthew C. Graham
Attorney, Agent, or Firm—Parkhurst, Oliff & Berridge

[57] ABSTRACT

A vibration isolating apparatus having a support shaft connected to either one of a vibration generating portion and a vibration receiving portion, a base member connected to the other of the two, and a resilient member interposed between the base member and the support shaft and deformable in response to the movement of the support shaft in a direction substantially perpendicular to the axis thereof. A stopper is provided on the side of the support shaft which is remote from a vibration absorbing liquid chamber for limiting the movement of the support shaft. Accordingly, even when a load acts on the support shaft and the base member in a direction in which they are pulled away from each other, the support shaft can reliably be supported by way of the stopper.

19 Claims, 7 Drawing Sheets

VIBRATION ISOLATING APPARATUS

BACKGROUND OF THE INVENTION

1. Field of the Invention

The present invention relates to a vibration isolating apparatus which may be employed as an engine mount, a cab mount or the like to absorb vibrations.

2. Description of the Related Art

A vibration isolating apparatus such as that shown in FIG. 6 has heretofore been employed as an engine mount.

In this type of vibration isolating apparatus, a top plate 14 is supported through a rubber member 12 by a base plate 10 which is secured to a body of a vehicle, and an engine is mounted on the top plate 14. A vibration absorbing liquid chamber 16 is disposed between the rubber member 12 and the base plate 10.

In such conventional vibration isolating apparatus, vibrations of the engine are absorbed by means of the rubber member 12 and the liquid chamber 16, and large horizontal movement of the engine is limited by the contact between a stopper 18 which projects from the top plate 14 and a ring plate 20 which is rigidly secured to the base plate 10.

In general, a plurality of such conventional vibration isolating apparatuses are employed to support one automotive engine, and each apparatus is disposed in such a manner that its longitudinal axis is slanted. Accordingly, when a reaction to the vibration of the engine acts on the vibration isolating apparatus, the top plate 14 may be moved away from the base plate 10. Since the apparatus has no means for limiting such movement of the top plate 14, it is necessary in order to prevent breaking of the constituent elements to make the structure of the apparatus sufficiently solid. The situation is particularly critical in the case of an engine mount of a front engine-front drive car which involves relatively large vibrations of the engine.

SUMMARY OF THE INVENTION

In view of the above-described circumstances, it is a primary object of the present invention to provide a vibration isolating apparatus which is capable of reliably supporting any external force which acts in the direction of pull.

To this end, the present invention provides a vibration isolating apparatus comprising: a support shaft which is able to be connected to either one of a vibration generating portion and a vibration receiving portion; a base member which is able to be connected to the other of the two; a resilient member interposed between the base member and the support shaft and deformable in response to the movement of the support shaft in a direction which is substantially perpendicular to the longitudinal axis of the support shaft; a vibration absorbing liquid chamber defined between the base member and the resilient member and disposed on one of the two sides which oppose each other across the longitudinal axis of the support shaft; and first stopper means disposed on the other side of the support shaft for limiting the movement of the support shaft.

By virtue of the above-described arrangement, vibrations transmitted from a vibration source are reliably and effectively absorbed by means of the resilient member and the liquid chamber, and when a load acts on the support shaft and the base member in a direction in which they are pulled away from each other, the support shaft is reliably supported by means of the stopper.

The above and other objects, features and advantages of the present invention will become more apparent from the following description of the preferred embodiments thereof, taken in conjunction with the accompanying drawings.

DESCRIPTION OF THE PREFERRED EMBODIMENTS

Figure 1:
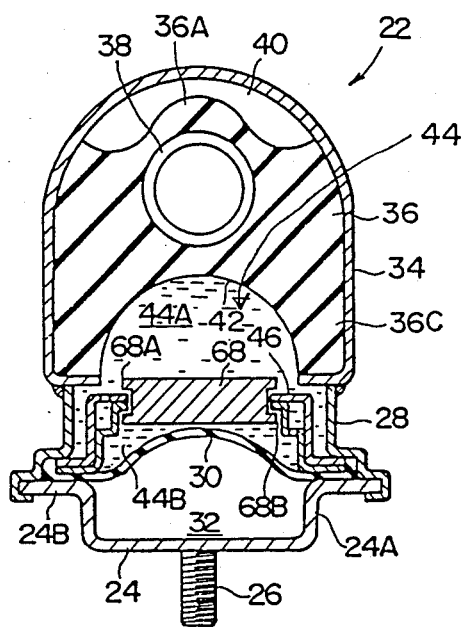
FIG. 1 is a sectional view of a first embodiment of the vibration isolating apparatus according to the present invention, which corresponds to a sectional view taken along the line I-I in FIG. 2.
Figure 2:
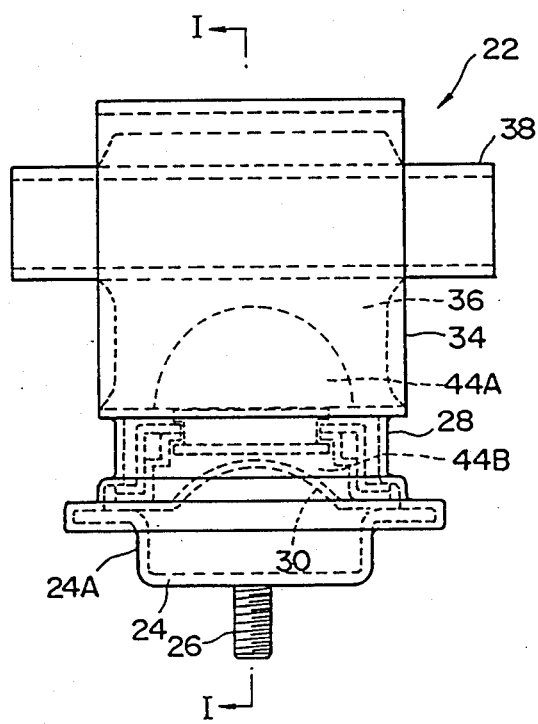
FIG. 2 is a side view of the first embodiment shown in FIG. 1.
Figure 3:
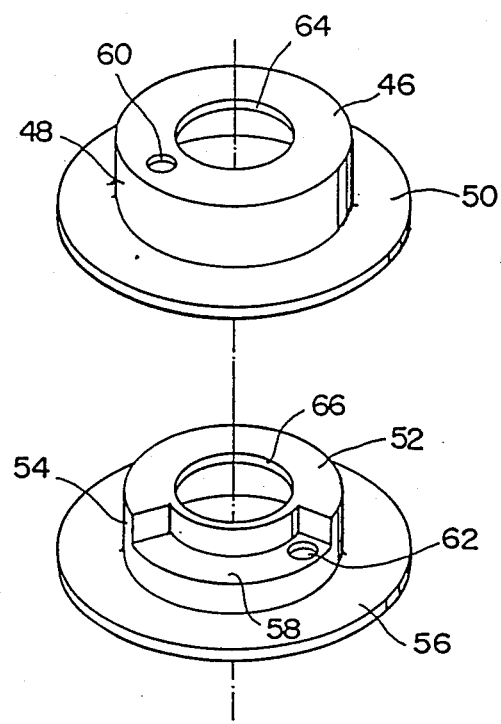
FIG. 3 is an exploded perspective view of a partition and an abutment plate which are employed to form a limiting passage.

FIGS. 1 to 3 show in combination a first embodiment of the vibration isolating apparatus according to the present invention. In this vibration isolating apparatus 22, a base plate 24 which defines a part of a base member is rigidly secured to a vehicle body (not shown) which defines a vibration receiving portion by means of a mounting bolt 26 which projects from the bottom of the base plate 24.

A wall portion 24A rises from the periphery of the base plate 24, and the upper end portion of the wall portion 24A is bent outward at right angles to define a flange portion 24B. The lower end portion of an outer tube 28 is rigidly secured to the flange portion 24B by means of caulking.

The outer peripheral portion of a diaphragm 30 is rigidly clamped between the lower end portion of the outer tube 28 and the flange portion 24B when they are secured together by means of caulking, thus defining an air chamber 32 between the diaphragm 30 and the base plate 24.

The lower end portion of a bracket 34 having a U-shaped cross-section is rigidly secured to the upper end portion of the outer tube 28. A resilient member 36 such as a rubber member is bonded to the inner side of the bracket 34 by means of vulcanization. A hollow support shaft 38 is fitted into the resilient member 36, and the outer periphery of the shaft 38 is bonded to the resilient member 36 by means of vulcanization in such a manner that the longitudinal axis of the support shaft 38 extends perpendicularly to that of the mounting bolt 26. An engine (not shown) which defines a vibration generating portion is mounted on and rigidly secured to the support shaft 38, so that vibrations of the engine are transmitted to the resilient member 36.

The resilient member 36 is cut at a portion 40 thereof which is located inside the upper end portion of the U-shaped bracket 34, thereby defining a thin-walled portion 36A which extends along the outer peripheral portion of the support shaft 38. The cut portion 40 enables the support shaft 38 to move toward the upper end of the bracket 34, and the movement of the support shaft 38 is stopped when the thin-walled portion 36A comes into contact with the inner periphery of the upper end portion of the bracket 34, thus limiting the movement of the support shaft 38 toward the upper end of the bracket 34.

Figure 1A:
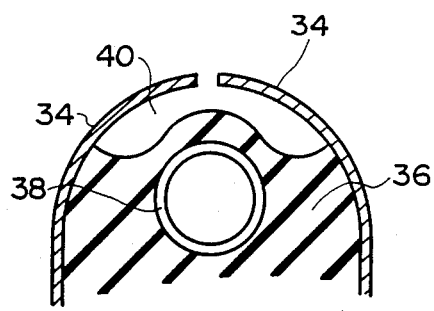
FIGS. 1A and 1B are fragmentary sectional views of the first embodiment, respectively showing other examples of the arrangement of the bracket employed in the present invention.
Figure 1B:
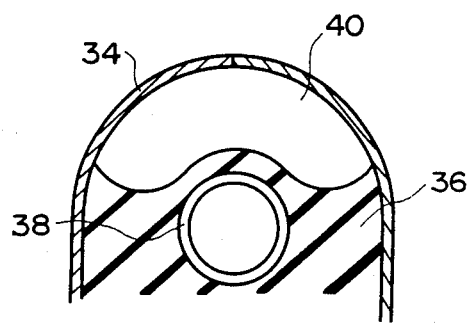

For this purpose, the upper end portion of the bracket 34 may be partially cut as shown in FIG. 1A, or the bracket 34 may be constituted by two plate members which are provided so as to stand on both sides, respectively, of the support shaft 38 as shown in FIG. 1B.

A portion of the resilient member 36 on the side of the support shaft 38 which is remote from the cut portion 40 is cut as at the reference numeral 42, thus forming a recessed undersurface having a U-shaped cross-section. A portion of the resilient member 36 which is located between the cut portion 42 and the bracket 34 defines a thick-walled portion 36C which enables any engine load applied to the support shaft 38 to be reliably supported.

A liquid chamber 44 is formed between the cut portion 42 and the diaphragm 30 and filled with a liquid such as water or oil, thus defining a vibration absorbing liquid chamber.

A partition 46 is disposed within the liquid chamber 44 to partition the chamber 44 into an upper small liquid chamber 44A and a lower small liquid chamber 44B. As also shown in FIG. 3, the partition 46 has a tubular portion 48 projecting downward from the outer peripheral portion thereof in such a manner that the axis of the tubular portion 48 extends perpendicularly to the plane of the partition 46. A flange plate 50 projects radially outward from the lower end of the tubular portion 48. The flange plate 50 is rigidly clamped between the base plate 24 and the lower end portion of the outer tube 28 together with the outer peripheral portion of the diaphragm 30.

An abutment plate 52 is brought into contact with and rigidly secured to the undersurface of the partition 46. The abutment plate 52 has a tubular portion 54 which is brought into close contact with the inner periphery of the tubular potion 48 and a flange portion 56 which is superposed on and rigidly secured to the flange plate 50.

The abutment plate 52 has a recess 58 at the joint between the same and the tubular portion 54, the recess 58 having a C-shaped planar configuration. Accordingly, the recess 58 cooperates with the partition 46 to define a limiting passage having a C-shaped planar configuration. The limiting passage is communicated with the upper and lower small liquid chambers 44A and 44B through small bores 60 and 62 which are respectively provided in the partition 46 and the recess 58. Accordingly, the liquid can move between the upper and lower small liquid chambers 44A and 44B through the limiting passage while encountering fluid resistance.

The partition 46 and the abutment plate 52 are respectively provided with circular bores 64 and 66 which have the same diameter as each other, and a vibrating plate 68 is inserted into the bores 64 and 66. The vibrating plate 68 has enlarged-diameter portions 68A and 68B which are located within the upper and lower small liquid chambers 44A and 44B, respectively. The length of a portion of the vibrating plate which is defined between the enlarged-diameter portions 68A and 68B is set so as to be larger than the total wall thickness of the partition 46 and the abutment plate 52, thus allowing the vibrating plate 68 to vibrate in the direction of the thickness thereof.

The operation of this embodiment will be described below.

The base plate 24 is secured to a vehicle body (not shown) by means of the mounting bolt 26, and an engine (not shown) is mounted on the support shaft 38.

The load of the engine is supported by the vehicle body through the base plate 24 by virtue of the deformation of the resilient member 36.

Vibrations of the engine are supported by the resilient member 36 through the support shaft 38. The vibrations can be absorbed by means of resistance generated on the basis of the internal friction of the resilient member 36.

When a vibration of relatively low frequency occurs, the liquid is moved between the upper and lower small liquid chambers 44A and 44B through the limiting passage, and the vibration is absorbed by means of fluid resistance occurring when the liquid passes through the limiting passage.

When a high-frequency vibration is generated by the engine, the limiting passage may be clogged or loaded. In such case, the vibrating plate 68 vibrates with a relatively small amplitude, thereby absorbing the vibration.

Since the U-shaped bracket 34 is provided in this embodiment, even when the support shaft 38 is displaced to a substantial extent by means of the reaction to the vibrational torque from the engine, the support shaft 38 abuts against the bracket 34 through the thin-walled portion 36A and is thereby reliably supported.

Figure 4:
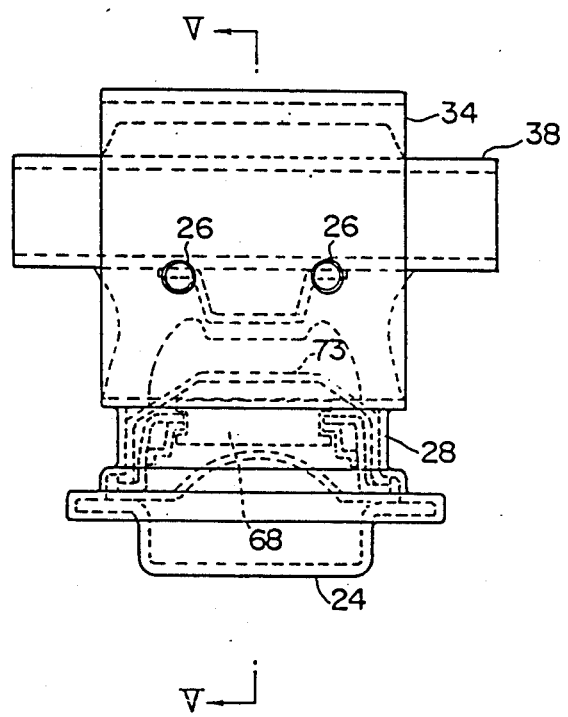
FIG. 4 is a side view showing a second embodiment of the present invention, which corresponds to FIG. 2.
Figure 5:
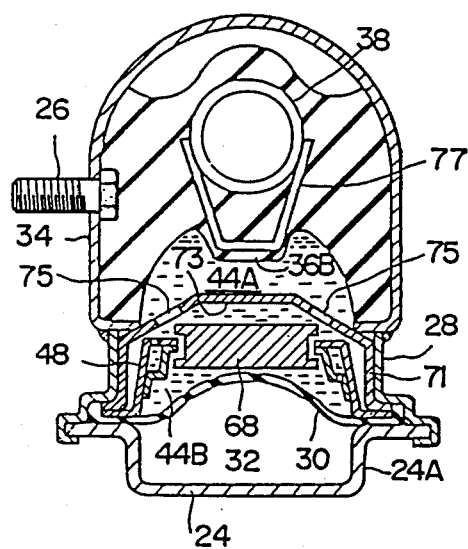
FIG. 5 is a sectional view taken along the line V-V in FIG. 4.
Figure 6:
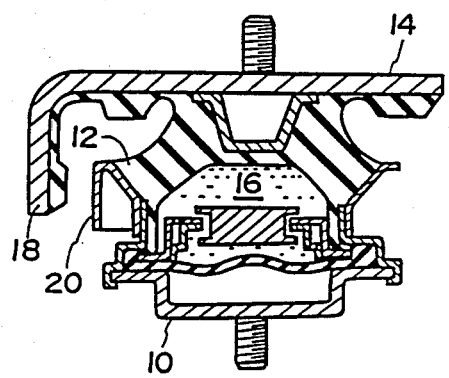
FIG. 6 is a sectional view of a conventional vibration isolating apparatus.

Referring next to FIGS. 4 and 5, there is shown a second embodiment of the present invention.

The configuration of this embodiment is basically similar to that of the above-described embodiment. In this embodiment, however, the mounting bolt 26 is secured to the side surface of the U-shaped bracket 34.

Further, an inner tube 71 is rigidly secured to the inner peripheral portion of the outer tube 28, and a support plate 73 is connected to the upper end portion of the inner tube 71 in one unit. The outer peripheral portion of the support plate 73 has a taper surface which is contiguous to the inner tube 71. The taper surface is provided with bores having a circular cross-section which define second limiting passages 75. Thus, the upper small liquid chamber 44A is further partitioned into two small liquid chambers by the support plate 73 so as to absorb vibrations having frequencies different from those of vibrations which are to be absorbed by means of the limiting passage defined by the partition 46 and the abutment plate 52.

The support plate 73 faces a stopper 77 which is rigidly secured to the support shaft 38 and a thin-walled portion 36B of the resilient member 36 which is extended so as to cover the lower end surface of the stopper 77. In this embodiment, therefore, when the support shaft 38 is moved downward as viewed in FIG. 5 to a substantial extent, the stopper 77 abuts against the support plate 73 to limit the downward movement of the support shaft 38.

It should be noted that in each of the above-described embodiments the support shaft 38 and the base plate 24 or the bracket 34 may be secured to the vehicle body and the engine, respectively, in a reverse manner to that described above.

Although the present invention has been described through specific terms, it should be noted here that the described embodiments are not necessarily exclusive and various changes and modifications may be imparted thereto without departing from the scope of the invention which is limited solely by the appended claims.

What is claimed is:

1. A vibration isolating apparatus comprising:
   a support shaft which is able to be connected to either one of a vibration generating portion and a vibration receiving portion;
   a base member which is able to be connected to the other of said vibration generating portion and said vibration receiving portion;
   a resilient member interposed between said base member and said support shaft and deformable in response to movement of said support shaft in a direction which is substantially perpendicular to the longitudinal axis of said support shaft;
   a vibration absorbing liquid chamber defined between said base member and said resilient member and disposed on one of two side which oppose each other across the longitudinal axis of said support shaft; and
   first stopper means defined by a bent portion of a bracket which is a part of said base member, said first stopper means being disposed on the other of said two sides of said support shaft for limiting the movement of said support shaft.

2. A vibration isolating apparatus according to claim 1, wherein a space portion is defined between said first stopper means and said resilient member.

3. A vibration isolating apparatus according to claim 1, wherein said first stopper means has a U-shaped cross-section.

4. A vibration isolating apparatus according to claim 1, wherein said bent portion is partially cut.

5. A vibration isolating apparatus according to claim 1, wherein said bracket is constituted by two plate members which stand on both sides, respectively, of said resilient member.

6. A vibration isolating apparatus according to claim 1, further comprising:
   second stopper means disposed on the side of said support shaft which is remote from said first stopper means.

7. A vibration isolating apparatus according to claim 1, wherein said base member includes a base plate having a bottom portion and a wall portion which rises from the periphery of said bottom portion, a hollow outer tube having one axial end portion thereof rigidly secured to the distal end portion of the wall portion of said base plate, and a bracket having a U-shaped cross-section which is rigidly secured to the other end portion of said outer tube.

8. A vibration isolating apparatus according to claim 7, wherein the outer peripheral portion of a diaphragm is secured between said end portion of the wall portion of said base plate and said first end portion of said outer tube, said vibration absorbing liquid chamber being defined between said diaphragm, said outer tube and said resilient member.

9. A vibration isolating apparatus according to claim 8, wherein said vibration absorbing liquid chamber is divided by a partition into a plurality of small liquid chambers.

10. A vibration isolating apparatus according to claim 9, wherein said partition is provided with a bore in which is interposed a vibrating plate in such a manner that said vibrating plate is able to vibrate in he direction of the thickness thereof.

11. A vibration isolating apparatus according to claim 10, wherein said plurality of small liquid chambers are communicated with each other through a first limiting passage.

12. A vibration isolating apparatus according to claim 11, wherein an air chamber is defined between said diaphragm and said base plate.

13. A vibration isolating apparatus according to claim 10, wherein an inner tube is rigidly secured to the inner peripheral portion of said outer tube so that said inner tube is positioned between said vibrating plate and said resilient member, and a support plate which has a taper surface formed on the outer peripheral portion thereof is rigidly secured to the central portion of said inner tube in one unit, said taper surface being provided with a bore which defines a second limiting passage.

14. A vibration isolating apparatus according to claim 13, wherein said support shaft has a projecting member rigidly secured thereto, said projecting member projecting toward said support plate to cooperate with the latter to define second stopper means for limiting the amount of movement of said support shaft toward said vibration absorbing liquid chamber.

15. A vibration isolating apparatus comprising:
   a support shaft connected to either one of a vibration generating portion and a vibration receiving portion;
   a base member connected to the other of said vibration generating portion and said vibration receiving portion, said base member including a base plate having a bottom surface and a wall portion which rises from the periphery of said bottom surface, a hollow outer tube having one axial end portion thereof rigidly secured to a distal end portion of the wall portion of said base plate, and a bracket having a U-shaped cross-section which is rigidly secured to a second axial end portion of said outer tube, said base member being constituted by said base plate, outer tube and bracket so as to define a closed space;
   a resilient member disposed within a U-shaped space in said bracket, pierced with said support shaft, and deformable in response to movement of said support shaft in a direction substantially perpendicular to the axis of said support shaft;
   a vibration absorbing liquid chamber defined between said base member and said resilient member and provided on one of two sides opposing each other across the axis of said support shaft; and
   a first stopper provided on the other of said two sides of said support shaft for limiting the movement of said support shaft in said direction.

16. A vibration isolating apparatus according to claim 15, wherein said first stopper is defined by a bent portion of said bracket.

17. A vibration isolating apparatus according to claim 16, wherein a space portion is defined between said first stopper and said resilient member.

18. A vibration isolating apparatus according to claim 17, wherein said bent portion is partially cut.

19. A vibration isolating apparatus according to claim 16, wherein said support shaft is provided with a second stopper which projects toward said vibration absorbing liquid chamber which is provided with a support plate adapted to abut against said second stopper to limit the movement of said support shaft.

* * * * *